US011531925B2

(12) United States Patent
Davies et al.

(10) Patent No.: US 11,531,925 B2
(45) Date of Patent: Dec. 20, 2022

(54) OPTIMIZING CONTENT DISTRIBUTION USING A MODEL

(71) Applicant: Google LLC, Mountain View, CA (US)

(72) Inventors: Scott Tadashi Davies, Santa Monica, CA (US); Kai Chen, Manhattan Beach, CA (US); Michael Jee-Kai Wang, Playa Vista, CA (US); Wei Jiang, Los Angeles, CA (US); Maryam Tavafi, Marine del Rey, CA (US); Peter Zaimis Tipton, Marina Del Rey, CA (US)

(73) Assignee: Google LLC, Mountain View, CA (US)

( * ) Notice: Subject to any disclaimer, the term of this patent is extended or adjusted under 35 U.S.C. 154(b) by 491 days.

(21) Appl. No.: 15/183,335

(22) Filed: Jun. 15, 2016

(65) Prior Publication Data

US 2017/0364822 A1    Dec. 21, 2017

(51) Int. Cl.
  *G06N 20/00* (2019.01)
  *G06F 16/22* (2019.01)
  (Continued)

(52) U.S. Cl.
  CPC .............. *G06N 20/00* (2019.01); *G06F 16/22* (2019.01); *G06F 16/435* (2019.01); *H04L 67/01* (2022.05); *H04L 67/06* (2013.01); *G06Q 30/0261* (2013.01)

(58) Field of Classification Search
  CPC ........ G06F 17/30029; G06F 17/30312; G60N 99/005; G60Q 30/0261; H04L 67/06; H04L 67/42
  See application file for complete search history.

(56) References Cited

U.S. PATENT DOCUMENTS

| 7,007,166 | B1 | 2/2006 | Moskowitz et al. |
| 2011/0004504 | A1 | 1/2011 | Ives et al. |

(Continued)

FOREIGN PATENT DOCUMENTS

| CN | 101517603 | 8/2009 |
| CN | 102223420 | 10/2011 |

(Continued)

OTHER PUBLICATIONS

Ryan Joe ("If a Video Ad Plays and No One Hears It, Does it Make an Impression?", web page adexchanger.com/digital-tv/if-a-video-ad-plays-and-no-one-hears-it-does-it-make-an-impression/, Archive.org, Jul. 13, 2014, 4 pages) (Year: 2014).*

(Continued)

*Primary Examiner* — Miranda M Huang
*Assistant Examiner* — Robert Lewis Kulp
(74) *Attorney, Agent, or Firm* — Fish & Richardson P.C.

(57) ABSTRACT

Methods, systems, and apparatus, including computer programs encoded on a computer storage medium, for optimizing content presentation. In one aspect, a system includes a training database that stores training data including attribute information about users and corresponding proxy metrics quantifying behavior by the users following content presentation; a content database; a model generator that accesses the training data and trains a model for content distribution; and a content distribution server that receives a content request, uses the model to select content, transmits data identifying the selected content, wherein the model: obtains a set of attributes for a user associated with the request, receives information about a given content, predicts a proxy metric based on the set of attributes and the information about the content, the predicted proxy metric providing information about subject retention or awareness; and iden- (Continued)

tifies the given content for distribution if the predicted proxy metrics meet a threshold.

16 Claims, 6 Drawing Sheets

(51) Int. Cl.
    *G06F 16/435*     (2019.01)
    *H04L 67/01*     (2022.01)
    *H04L 67/06*     (2022.01)
    *G06Q 30/02*     (2012.01)

(56) References Cited

U.S. PATENT DOCUMENTS

| | | |
|---|---|---|
| 2011/0040616 A1 | 2/2011 | Kannan et al. |
| 2011/0173063 A1 | 7/2011 | Bhatia et al. |
| 2014/0068011 A1* | 3/2014 | Zhang ............... H04L 67/20 709/219 |
| 2014/0095325 A1 | 4/2014 | Kim et al. |
| 2017/0068992 A1* | 3/2017 | Chen ............... G06Q 30/0269 |

FOREIGN PATENT DOCUMENTS

| | | |
|---|---|---|
| CN | 105590240 | 5/2016 |
| CN | 105431834 | 10/2018 |
| WO | 2005/001659 | 1/2005 |
| WO | 2012/048244 | 4/2012 |
| WO | 2015/010091 | 1/2015 |

OTHER PUBLICATIONS

Jeremy Ostermiller ("After Addressing Initial Video Viewability, These are the Metrics that Matter", web page altitudedigital.com/line/after-addressing-initial-video-viewability-these-are-the-metrics-that-matter/, archive.org Jul. 1, 2015, one page) (Year: 2015).*

Yi et al. ("Beyond Clicks: Dwell Time for Personalization", RecSys'14, Oct. 6-10, 2014, pp. 1-8) (Year: 2014).*

Wang et al. ("Viewability Prediction for Online Display Ads", CICM'15, Oct. 19-23, 2015, pp. 413-422) (Year: 2015).*

Dean Donaldson ("Online Display: The demise of Click, the rise of Dwell", Phase2: Current Practice, Unit 3: Creative Development & Production, Bournemouth University Masters in Creative Media Practice, Jun. 14, 2009, pp. 1-58) (Year: 2009).*

International Preliminary Report on Patentability issued in International Application No. PCT/US2016/067189, dated Jun. 28, 2018, 13 pages.

Written Opinion issued in International Application No. PCT/US2016/067189, dated Apr. 11, 2018, 12 pages.

International Search Report and Written Opinion issued in International Application No. PCT/US2016/067189, dated May 3, 2017, 18 pages.

JR Notice of Reasons for Rejection in Japanese Application No. 2018-551196, dated Dec. 11, 2019, 13 pages (with English translation).

KR Office Action in Korean Application No. 10-2018-7027903, dated Oct. 18, 2019, 21 pages (with English translation).

EP Office Action in European Application No. 16843243.3, dated Jun. 26, 2020, 8 pages.

KR Notice of Allowance in Korean Application No. 10-2018-7027903, dated May 27, 2020, 4 pages (with English translation).

EP Office Action in European Application No. 16843243.3, dated Jan. 12, 2021, 10 pages.

CN Office Action in Chinese Application No. 201680084301.4, dated Apr. 2, 2021, 19 pages (with English translation).

\* cited by examiner

VIDEO CONTENT SUBJECT: SPORTS CARS (video length=2.00; average watch time=0:59)

| USER | M/F | AGE | WATCH TIME |
|---|---|---|---|
| 1 | F | 21 | 0:28 |
| 2 | F | 24 | 0:15 |
| 3 | F | 19 | 0:13 |
| 4 | F | 18 | 0:06 |
| 5 | F | 21 | 1:59 |
| 6 | F | 22 | 0:09 |
| 7 | F | 18 | 0:02 |
| 8 | M | 20 | 1:56 |
| 9 | M | 20 | 1:57 |
| 10 | M | 23 | 2:00 |
| 11 | M | 22 | 0:07 |
| 12 | M | 19 | 1:17 |
| 13 | M | 18 | 1:48 |
| 14 | M | 24 | 1:32 |

FIG. 3

VIDEO CONTENT SUBJECT: SLAPSTICK COMEDY TRAILER (video length=2.00; average watch time=1:10)

| USER | M/F | AGE | WATCH TIME |
|---|---|---|---|
| 1 | F | 21 | 1:56 |
| 2 | F | 24 | 1:07 |
| 3 | M | 20 | 2:00 |
| 4 | M | 18 | 1:32 |
| 5 | F | 21 | 1:47 |
| 6 | M | 23 | 1:53 |
| 7 | F | 18 | 1:42 |
| 8 | M | 68 | 0:22 |
| 9 | F | 65 | 1:09 |
| 10 | F | 74 | 0:17 |
| 11 | F | 77 | 0:04 |
| 12 | M | 88 | 2:00 |
| 13 | M | 67 | 0:23 |
| 14 | F | 71 | 0:11 |

FIG. 4

VIDEO CONTENT SUBJECT: MINNESOTA SEAFARERS (video length=2:00; average watch time=1:04)

| USER | M/F | AGE | LOCATION | WATCH TIME |
|---|---|---|---|---|
| 1 | F | 21 | Chicago, IL | 0:08 |
| 2 | F | 24 | Minneapolis, MN | 0:12 |
| 3 | F | 19 | Detroit, MI | 0:06 |
| 4 | F | 18 | Minneapolis, MN | 0:35 |
| 5 | F | 24 | Minneapolis, MN | 1:37 |
| 6 | F | 35 | Madison, WI | 0:14 |
| 7 | F | 40 | Minneapolis, MN | 1:51 |
| 8 | F | 57 | Minneapolis, MN | 0:42 |
| 9 | F | 67 | Minneapolis, MN | 1:01 |
| 10 | M | 36 | Minneapolis, MN | 1:47 |
| 11 | M | 65 | Minneapolis, MN | 0:53 |
| 12 | M | 20 | Minneapolis, MN | 1:52 |
| 13 | M | 20 | Minneapolis, MN | 1:47 |
| 14 | M | 23 | Green Bay, WI | 0:01 |
| 15 | M | 22 | Minneapolis, MN | 2:00 |
| 16 | M | 19 | Minneapolis, MN | 1:37 |
| 17 | M | 18 | Minneapolis, MN | 1:49 |
| 18 | M | 24 | Milwaukee, WI | 1:08 |

FIG. 6A

VIDEO CONTENT SUBJECT: TOP TEN HOCKEY GOALS (video length=2:00; average watch time=1:06)

| USER | M/F | AGE | LOCATION | WATCH TIME |
|---|---|---|---|---|
| 1 | F | 21 | Chicago, IL | 0:02 |
| 2 | F | 24 | Minneapolis, MN | 0:38 |
| 3 | F | 19 | Detroit, MI | 1:59 |
| 4 | F | 18 | Minneapolis, MN | 0:04 |
| 5 | F | 24 | Minneapolis, MN | 1:32 |
| 6 | F | 35 | Madison, WI | 0:34 |
| 7 | F | 40 | Minneapolis, MN | 0:22 |
| 8 | F | 57 | Minneapolis, MN | 0:11 |
| 9 | F | 67 | Minneapolis, MN | 0:08 |
| 10 | M | 36 | Minneapolis, MN | 1:51 |
| 11 | M | 65 | Minneapolis, MN | 1:59 |
| 12 | M | 20 | Minneapolis, MN | 1:32 |
| 13 | M | 20 | Minneapolis, MN | 1:39 |
| 14 | M | 23 | Green Bay, WI | 1:17 |
| 15 | M | 22 | Minneapolis, MN | 2:00 |
| 16 | M | 19 | Minneapolis, MN | 1:57 |
| 17 | M | 18 | Minneapolis, MN | 1:57 |
| 18 | M | 24 | Milwaukee, WI | 0:04 |

FIG. 6B

OPTIMIZING CONTENT DISTRIBUTION USING A MODEL

BACKGROUND

This specification relates to optimizing content presentation.

Video content can be distributed for presentation on various client devices, such as mobile devices and personal computers over the Internet. The types of content provided for a particular user can be selected in various ways in order to present content that will be of interest to the particular user.

SUMMARY

In general, one innovative aspect of the subject matter described in this specification can be embodied in a system comprising: a training database that stores training data including attribute information about a plurality of users and corresponding proxy metrics that quantify online behavior by the plurality of users following content presentation; a content database that stores third party content received from various third party content providers; a model generator that accesses the training data in the training database and trains a model for third party content distribution based on the training data; and a content distribution server that receives a request for third party content to be presented with another portion of content at a client device, wherein the content distribution server uses the model to select third party content to be distributed to the client device in response to the request and transmits data identifying the selected third party content to the client device, wherein the model: obtains a set of attributes from the request, wherein the set of attributes relate to information about a user associated with the request, receives information about a given third party content stored in the content database, predicts, for the given third party content, a proxy metric based on the set of attributes and the information about the third party content, wherein the predicted proxy metric provides information about at least one of subject retention or subject awareness that will result from presentation of the given third party content; and identifies, using the predicted proxy metrics and for the content distribution server, the given third party content for distribution based on the predicted proxy metrics meeting a threshold. Other embodiments of this aspect include corresponding methods, apparatus, and computer programs, configured to perform the actions of the methods, encoded on computer storage devices.

These and other embodiments can each optionally include one or more of the following features. In some implementations, the information about the given third party content in the content database includes at least one of a category of the given third party content, a duration for the given third party content, and a feature of the given third party content. The training database may further receive proxy metrics associated with displaying particular third party content to the client device, and the model generator may further retrain the model using the received proxy metrics associated with displaying the particular third party content to the client device. In some implementations, the model further weighs certain categories of attribute information and predicts the proxy metric based on weighted attribute information.

The request for third party content may contain no known attribute information, but the model may identify training data regardless of attribute information. In some implementations, the proxy metrics include at least one of clicks on the video content, watch time associated with video content, skip time associated with video content, viewability metrics associated with the video content, and audioability associated with the video content. In some implementations, each third party content of the third party content received from the various third party content providers includes a preference for subject retention or subject awareness.

In some implementations, the model identifies the given third party content based on the preference. In some implementations, the model generator identifies and stores a correlation between a particular proxy metric and subject retention. In some implementations, the model generator identifies and stores a correlation between a particular proxy metric and subject awareness. In some implementations, the model predicts the proxy metrics using at least one of logistic regression machine learning and linear regression machine learning.

Providers of online content have various goals associated with presentation of their content. Some content providers are focused on driving awareness of a subject associated with the content, such as a particular cause or a brand. Content providers who are focused on driving subject awareness prioritize having people see the content in order to learn and become aware of a subject or topic related to the content. Some content providers have a goal of improving retention of a subject associated with the content. In particular, content providers want viewers to remember what content they previously saw and be able to recall the subject or topic associated with the content at a later time. Implementations described herein may help content providers to optimize presentation and distribution of their content in order to improve at least one of either subject awareness or subject retention.

As used herein, attribute information relates to information about a user, such as demographic information. Proxy metrics refer to quantitative values that relate to a user's behavior in response to viewing content, including video clicks, content watch time, skip time, and viewability.

Third party content may refer to any type of content provided by a third party, including text, images, video files, sound clips, or any combination thereof. An example of third party content is an advertisement. Another example of third party content is a video clip. Subject retention refers to the likelihood that a user will remember a subject or topic related to a content item at a later time. Subject awareness refers to whether someone is familiar or how familiar someone is with a particular subject or topic related to a content item.

Particular implementations of the subject matter described in this specification can be implemented so as to realize one or more of the following advantages. The technology provides an improved user experience by selecting content that a user is most likely to find interesting and interact with, and therefore either remember or become aware of after viewing the content. Additionally, implementations described herein allow for improved content presentation in the absence of data that directly indicates how a user will respond to content. Instead, implementations described herein provide for the use of proxy metrics as indicators for likely user response to content presentation, for example, when sufficient directly measured user response data is not available. Furthermore, particular implementations described herein achieve other benefits including increased flexibility in situations where data about a particular user's interests are not known and smaller memory requirements where data about particular users need not be stored.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a table showing example training data for video content.

FIG. 4 is a table showing additional example training data for video content.

FIGS. 6A-6B are tables showing further examples of training data for video content.

Like reference numbers and designations in the various drawings indicate like elements.

DETAILED DESCRIPTION

Figure 1:
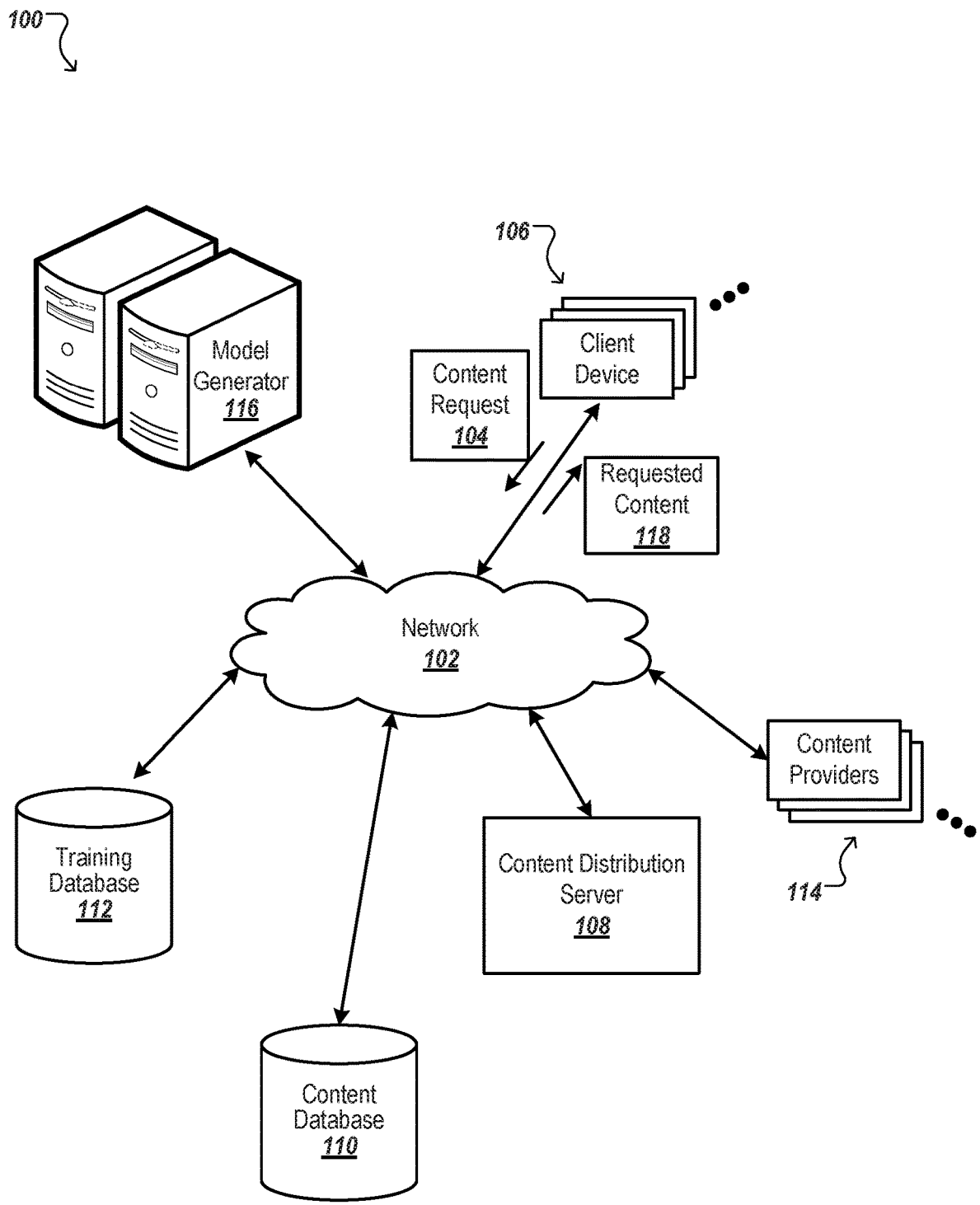
FIG. 1 is a block diagram of an example environment in which a content distribution system manages distribution of content.

This document describes the use of proxy metrics to optimize a subject "lift," or rise in interest in a particular subject. For example, when information related to subject "lift" is not directly available through a feedback loop, or another feedback mechanism, proxy metrics that have a strong correlation to directly measureable metrics relating to "lift" metrics relating to a particular subject can be used to generate a predictive model that can predict the expected "lift" that will be provided by various portions of content (e.g., based on attributes of the content). "Lift" metrics relate to quantitative values that are indicative of a rise in interest, awareness, or recall in a particular subject by users who have been exposed to a given portion of content, such as subject retention and subject awareness of users who have been exposed to the given portion of content.

Example proxy metrics relating to the display of video content that have a strong correlation with subject lift include any physical click on the video content, content watch time, content skip time, viewability, and audioability. A physical click on content may include a user clicking on content (e.g., a user clicking on a video being presented, or clicking on a link to a website associated with a third party that provided the content). Content watch time refers to the amount of time video content is presented at a client device before the video is stopped or an application (e.g., a web page or video player application) in which the video is being presented in closed. Content skip time refers to the amount of time skippable video content is presented at a client device before input to skip or pass on viewing the skippable video content (e.g., to view other content) interrupts (e.g., halts or skips) playback of the skippable video content. Viewability refers to a likelihood that a user is actually physically present and watching the displayed content. For example, if a user is clicking on other areas displayed on the computer or interacting with content displayed on the computer, then the user is likely present and able to view the content. Audioability refers to a likelihood that a user is actually physically present and listening to provided content having audio. Audioability may be determined, for example, by identifying an audio level of a user's computing device to determine whether a user can hear the audio content.

This application discusses using these proxy metrics, which are correlated with subject lift metrics, for optimizing content presentation. For example, this application discusses training a model that uses proxy metric training data to predict proxy metrics for content that will be subsequently displayed. Content with predicted proxy metrics that are above a predetermined threshold (e.g., higher than average or other present value) may be selected for presentation in order to optimize (or otherwise improve) subject retention or subject awareness for a subject relating to the content.

FIG. 1 is a schematic diagram of an example environment 100 for using proxy metrics to optimize content presentation. In some implementations, the example environment selects content in response to a request for content 104 and attributes associated with the request by analyzing proxy metrics for the attributes.

The example environment 100 includes a data communication network 102, such as a local area network (LAN), a wide area network (WAN), the Internet, or a combination thereof. The network 102 enables data communication between multiple electronic devices and systems. In particular, the network 102 connects a client device 106, content distribution server 108, content database 110, training database 112, a plurality of third party content providers 114, and a model generator 116. Communications links of the network can be wireline or wireless links or both. Client device 106 is an electronic device that is under control of a user and is capable of requesting and receiving resources over the network 102. Example client devices 106 include laptop computers, desktop computers, television devices that are enabled to stream online video content, mobile communication devices (e.g., smart phones, tablet computing devices, netbooks, notebook computers, or wearable devices), and other devices that can send and receive data over the network 102.

A client device 106 typically includes a user application, such as a web browser, to facilitate the sending and receiving of data over the network 102. The content distribution server 108, content database 110, training database 112, and model generator 116 may include laptops, desktops, workstations, personal digital assistants, servers, blade servers, mainframes, and other appropriate computers. Servers may generally comprise a collection of one or more computers and may perform processing across the one or more computers in one or more geographically separated locations.

In many cases, content providers 114 may include parties that organically created their own content (e.g., videos) to share with others, but content providers 114 may also refer to parties who upload content that was actually created by one or more other parties but which the first party wishes to share. The content providers 114 may upload original content to the content database 110. The content database 110 is generally responsible for storing third party content that has been made available for distribution.

Figure 7:
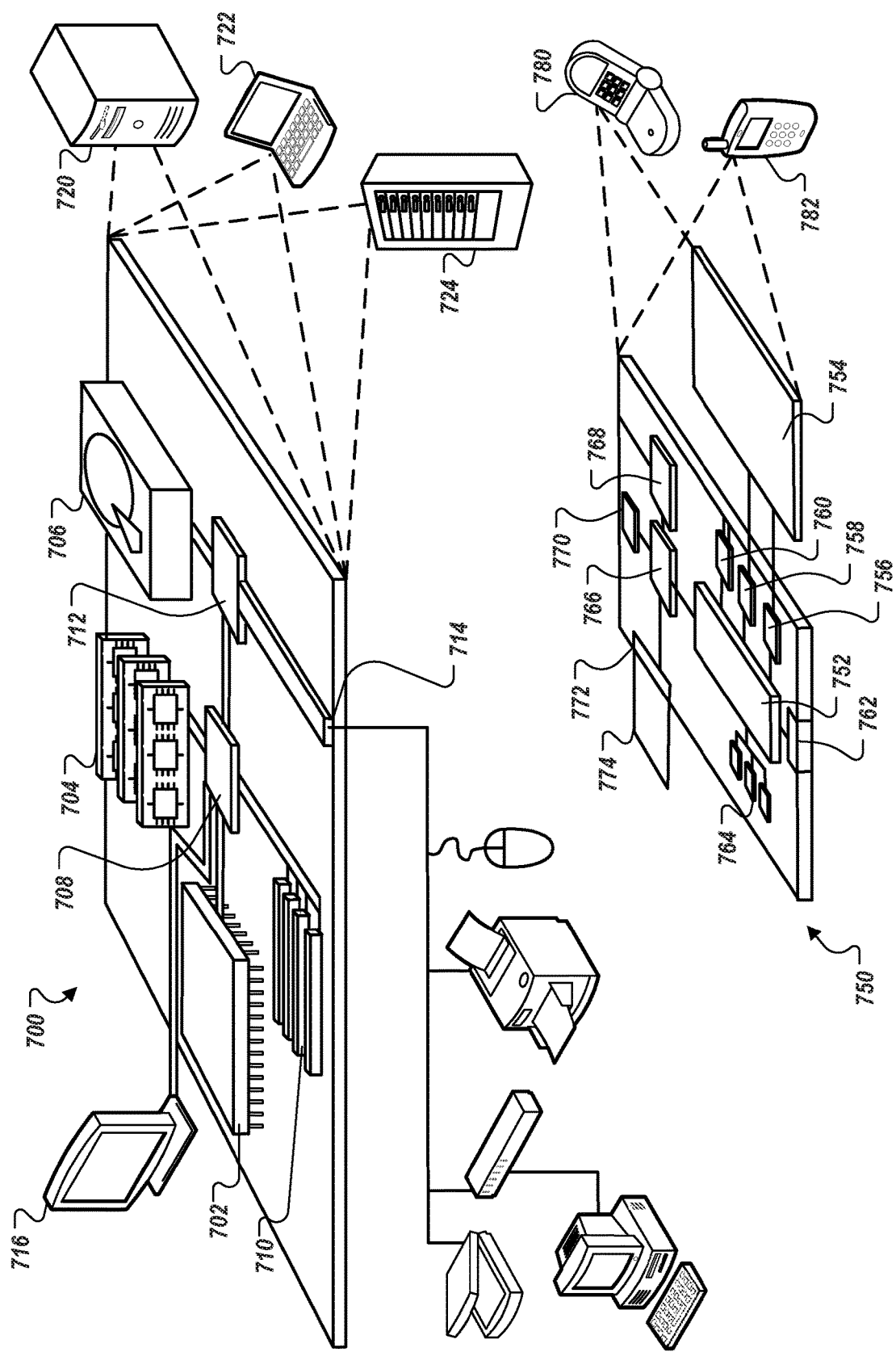
FIG. 7 is an example of a computing device and a mobile computing device that may be used to implement the computer-implemented methods and other techniques described herein.

Each of the content distribution server 108, content database 110, and training database 112, and model generator 116 may generally be implemented as a combination of hardware and software of one or more computers in one or more locations, such as computers described with respect to FIG. 7. Each of the content distribution server 108, content database 110, and training database 112, and model generator 116 may include a respective network interface to enable network communications. In some implementations, one or more of the distribution server 108, content database 110, and/or training database can be implemented in a distributed computing environment that uses multiple different computers and/or servers to process data.

In some implementations, a client device 106 submits a request for content 104 over a network. The user of the client device 106 may be browsing for content, such as HTML pages, electronic documents, image files, video files, and audio files, in a web browser on the client device 106. For example, a requested web page may include particular content 118 that is requested from the content distribution server 108. The requested content 118 may be presented with another portion of content at the client device. In order to determine which content to provide for presentation on the client device 106, the content distribution server 108 may use a model to select third party content from the content database 110.

The model is generated using a model generator 116 that accesses training data stored in a training database 112. The training database 112 stores training data, which includes a variety of data including attribute information (e.g., user demographics) and corresponding proxy metrics. The proxy metrics quantify users' online behavior following presentation of particular content and correspond to particular attribute information for the user or users exhibiting the online behavior. For example, the training database may store training data that includes, among the data stored, data indicating that men between the ages of 18-24 tend to respond positively (e.g., by clicking on video content or having a high content watch time) when presented with videos relating to sports cars. The training database may similarly store training data that indicates that women between the ages of 18-24 tend to respond negatively (e.g., by skipping video content or having a low content watch time) when presented with the same videos relating to sports cars. Examples of training data are shown in FIGS. 3, 4, and 6A-6B, discussed further below.

When the content distribution server 108 receives a request for third party content 104 to be presented at a client device, the content distribution server 108 uses the model generated by the model generator 116 to select third party content to be distributed to the client device in response to the request 104. The model identifies content for presentation by first obtaining a set of attributes from the request for content. The model then identifies proxy metrics (e.g., in the stored training database 112) that correspond to attribute information that matches the set of attribute information from the request for content. Next, the model receives information about a particular third party content stored in the content database 110. Based on the set of attributes from the request for content 104, the proxy metrics that correspond to the set of attributes, and the information about the particular third party content, the model then predicts a proxy metric for the set of attributes for the particular third party content.

In some implementations, the predicted proxy metric correlates to at least one of subject retention or subject awareness. That is, as a value of the predicted proxy metric increases, there is a corresponding increase in a user's recollection of a subject relating to the content or in a user's awareness in a subject relating to the content. The model then selects a third party content based on the predicted proxy metric meeting or exceed a threshold value (e.g., pre-specified value). The content distribution server 108 then transmits data identifying the selected third party content to the client device 106. In some implementations, after the model selects the third party content based on the predicted proxy metric, a selection criteria associated with the third party content is adjusted.

Figure 2:
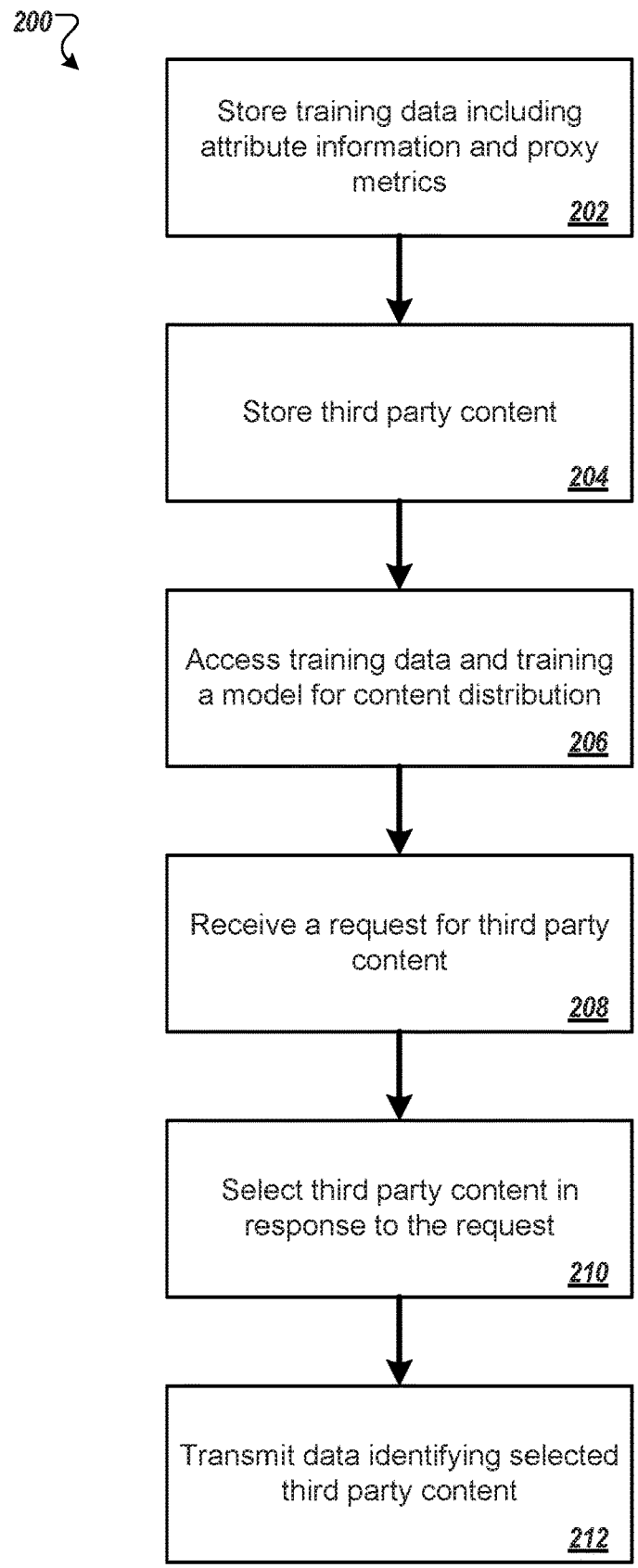
FIG. 2 is a flow chart of an example process for optimizing content distribution.

FIG. 2 is a flow chart of an example process 200 for optimizing content presentation. At 202, training database 112 stores training data. The training data includes a variety of data including attribute information (e.g., user demographics) and corresponding proxy metrics. Proxy metrics quantify users' online behavior following presentation of particular content and correspond to particular attribute information for the user or users exhibiting the online behavior. Example proxy metrics include physical clicks on content, content watch time, content skip time, viewability, and audioability.

The training database 112 may store a variety of data including different attribute information. For example, the training database 112 may store training data that includes data indicating that men between the ages of 18-24 tend to respond positively (e.g., by clicking on video content or having a high content watch time) when presented with videos relating to sports cars. The training database 112 may similarly store training data that indicates that women between the ages of 18-24 tend to respond negatively (e.g., by skipping video content or having a low content watch time) when presented with the same videos relating to sports cars. This trend may be shown by having a large number of entries of training data in the training database 112 for men between the ages of 18-24 with corresponding proxy metrics showing a positive response to videos relating to sports cars, as shown, for example, in FIG. 3.

In the example training data shown in FIG. 3, fourteen users, including both males and females, between the ages of 18-24 are presented with video content relating to sports cars. The video content has a length of 2 minutes. The first column identifies the user, the second column identifies whether the user is male or female, the third column indicates the age of the user, and the fourth column identifies the amount of time the user spent watching the 2 minute video. The average watch time for all fourteen users is approximately 59 seconds. However, the average watch time for the female users is only about 27 seconds while the average watch time for the male users is about 91 seconds. Therefore, the training data shows that male users between the ages of 18-24 tended to respond more positively to video content relating to sports cars (e.g., by watching more of the video content) than females users between the ages of 18-24. While there are outliers in the training data (e.g., user 5 is a 21 year old female who watched nearly all of the sports car video content; user 11 is a 22 year old male who watched only 7 seconds of the sports car video content), a general trend can be seen in the proxy metrics and attribute information.

In another example, shown in FIG. 4, the training database 112 may store training data that includes data indicating that both men and women between the ages of 18-24 tend to respond positively when presented with content relating to an upcoming slapstick comedy movie while both men and women ages 65 and older tend to respond negatively when presented with the same content. As with FIG. 3, the first column identifies the user, the second column identifies whether the user is male or female, the third column indicates the age of the user, and the fourth column identifies the amount of time the user spent watching the 2 minute video. The average watch time for all fourteen users is approximately 1 minute and 10 seconds. The average watch time for the male and female users between the ages of 18-24 is approximately 1 minute and 42 seconds while the average watch time for the male and female users older than 65 years old is about 38 seconds. Therefore, the training data shows that both male and female users between the ages of 18-24 tended to respond more positively to video content relating to the slapstick comedy (e.g., by watching more of the video content) than both male and female users who are older than 65. Although there are outliers in the data (e.g., user 12 is a 77 year old female who watched the entire 2 minutes of the slapstick comedy trailer), a general trend can be seen in the proxy metrics and attribute information.

At 204, the content database receives and stores third party content from one or more third party content providers 114. The content may be in the form of a compressed file containing various assets (e.g., HTML content, Javascript®, image files, video files, etc.). In some implementations, the content may be in the form of individual content files (e.g., video files) that are not compressed. The content database 110 may include an index of all content, including a title, a short textual description, and a creator ID for a given content item.

In some implementations, the third party content providers 114 may include, with the third party content, a preference for driving subject awareness or subject retention. The third party content providers 114 may indicate a desire to drive either subject awareness or subject retention or both. This preference may be taken into account when selecting content for presentation by using a particular model for optimizing either subject awareness or subject retention. Third party content providers 114 who wish to increase awareness in a particular subject matter or topic related to their content need to provide to users who are likely to become aware of the subject matter or topic after viewing their content. Third party content providers 114 who wish to drive subject retention may focus on presenting their content to those who will likely remember seeing or being presented with their content a certain amount of time after content presentation (e.g., two weeks after seeing the content). Absent data that directly indicates a likelihood of subject "lift", other data can be used as a proxy for subject "lift" data. This other data can be obtained through direct feedback from individual users for whom attributes of the users and attributes of the content are known.

At 206, the model generator 116 accesses the training data in the training database 112 and trains a model for content distribution. In some implementations, a framework that permits large-scale supervised machine learning may be used for training the model. In some implementations, logistic regression and linear regression are used as the machine learning algorithm for training the model. For example, logistic regression may be used for physical clicks, viewability, and audiobility, while linear regression may be used for watch time and skip time. The model generator 116 uses various types of information to train the model, including features relating to third party content and attributes relating to users. Examples of features relating to third party content include the duration of the content (e.g., the length of a video clip), a third party content provider associated with the content, and the subject or category of the content (e.g., whether the content relates to sports cars, travel destinations, or women's clothing). Examples of attributes relating to users include whether a user is male or female, an age of the user or an age range associated with the user, interest of the user, and a location associated with the user.

Individual models may be generated and trained for each proxy metric using the third party content feature and attributes. For example, the model generator 116 may generate a first model for a proxy metric relating to video clicks, a second model for a proxy metric relating to viewability, a third model for a proxy metric relating to watch time, a fourth model for a proxy metric relating to skip time, etc. Individual parameters (e.g., regularization parameters) in the framework may be tuned for each model. The parameters may be tuned to avoid overfitting on training data. Overfitting refers to when the model picks up on fine-grained features and assigns higher weights to them, resulting in less accuracy. Tuning involves testing different values for the parameters to determine how a level of accuracy of the model on testing data is affected. In some implementations, the models are updated in regular intervals (e.g., every three minutes) with new training data. The training data may be gathered each time a user is presented with third party content.

The models may be stored in a server, including, for example, in the content distribution server 108. In implementations where a model is not stored in the content distribution server 108, the content distribution server 108 may access the model in a remote database or server over the network 102.

At 208, the content distribution server 108 receives a request for third party content. The request may be for third party content to be presented with another portion of content at a client device. The requested content may be for text, an image, video content, audio content, or any combination thereof. The request may be associated with certain attributes. In some implementations, the request may comprise a set of attributes associated with a user and/or a client device requesting the content. For example, the request may identify a type of client device requesting the content, such as a smart phone or a personal computer. The request may further identify the specific type of client device, including the manufacturer and model of the client device. In some implementations, the request may identify an operating system running on the client device or an application associated with the request for third party content. These attributes may assist in selecting appropriate content that match the device capabilities.

In some implementations, the request may identify a set of attributes associated with a user of the client device. The set of attributes may include, for example, demographic information about the user of the client device, including, for example, the user's gender, age, location, and interests. In some implementations, the request may identify a set of attributes associated with content that the user is viewing or already being presented with in order to better select third party content to be presented in association with that content. For example, if a user is viewing a video associated with a particular category (e.g., cars or cooking), it may be advantageous to select additional third party content to present to the user related to that same topic so that that user is more likely to be interested in the additional third party content.

At 210, the content distribution server 108 selects the third party content in response to the request. In particular, the content distribution server 108 accesses the model generated by the model generator 116 in order to select the third party content. The process of selecting the third party content using the model is described in greater detail below with reference to FIG. 5.

At 212, the content distribution server 108 transmits data identifying the selected third party content. In some implementations, the content distribution server 108 transmits the data identifying the selected third party content to the client device 106. In some implementations, the data transmitted to the client device 106 includes machine readable instructions that initiate presentation of the selected third party content. For example, the instructions can cause the client device 106 to initiate a request to another online server from which the selected third party content will be obtained. Alternatively, the selected third party content can be included in the data transmitted to the client device 106, and the instructions can cause the client device 106 to present the third party content in a display of the client device 106.

Figure 5:
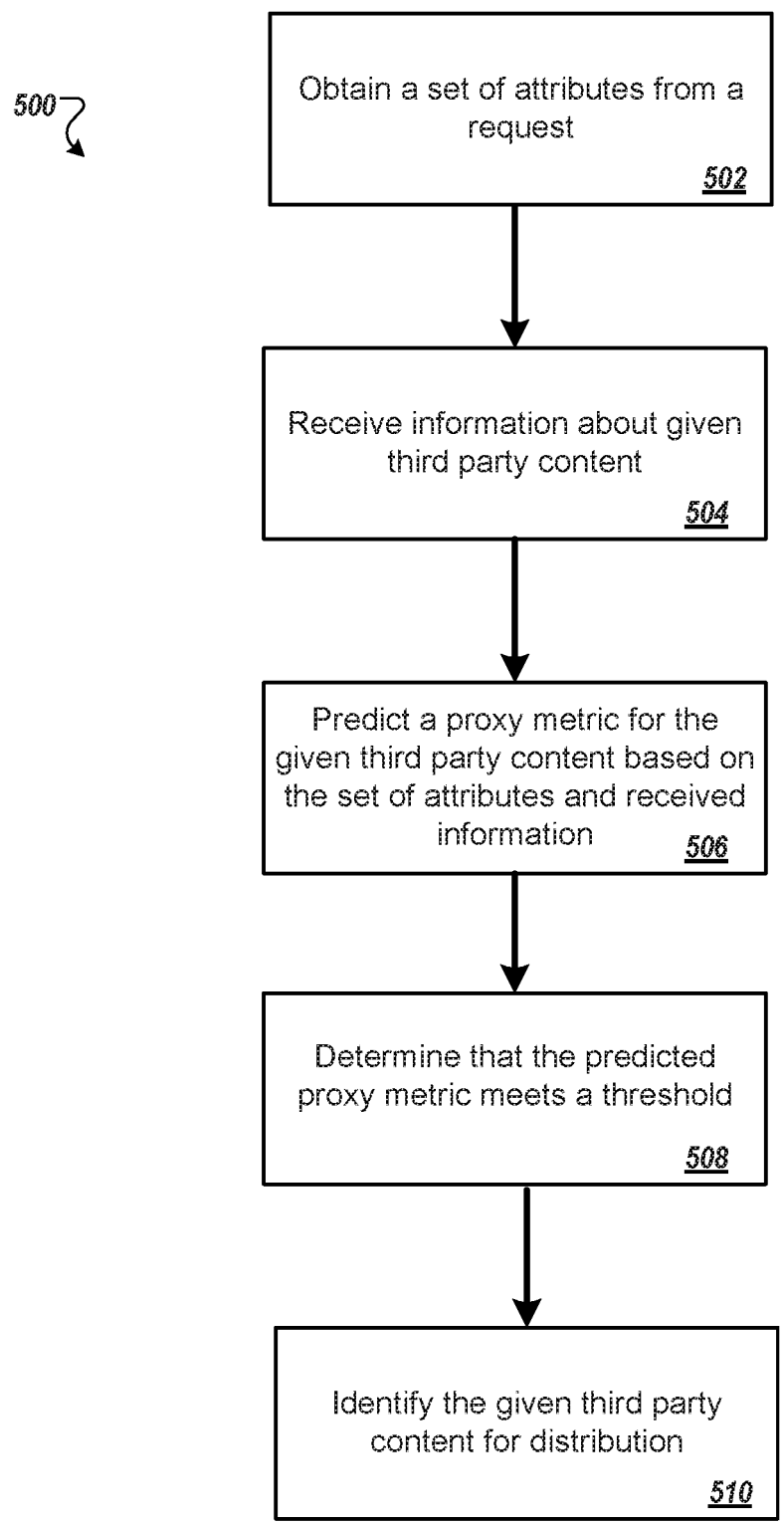
FIG. 5 is a flow chart of an example process for selecting third party content for display.

FIG. 5 is a flow chart of an example process 500 for selecting content with a model. In some implementations, some or all of the operations of the process 500 can be performed by the content distribution server 108, the model generator 116, a separate content distribution system, or any combination thereof. The model discussed below can be trained, for example, by the model generator 116 using training data including proxy metrics and attribute information stored in the training database 112. For illustrative purposes, the process 500 is discussed broadly with respect to a content distribution system, but it may be achieved by any combination of the content distribution server 108, the model generator 116, and a separate content distribution system.

At 502, the content distribution system obtains a set of attributes from the request for third party content. For example, the request for third party content may identify that the request is from a client device used by 22 year old male user in Minneapolis, Minn., who is using a smart phone device. Additionally or alternatively, the set of attributes may relate to content that a user is already viewing or about to view. For example, the request for third party content may identify that a video the user is already watching relates to a particular category, such as sports, cars, or cooking.

At 504, the content distribution system receives information about a given third party content stored in the content database. Continuing the example above, the content distribution system may identify a content item relating to the Minnesota Pucks hockey team. The information about the content item may indicate that the content item is a video clip, that the video clip is 2 minutes long, and that the key words relating to the video clip include "sports", "hockey", "Minnesota", and "Pucks".

At 506, the content distribution system uses the model to predict, for the given third party content, a proxy metric based on the set of attributes from the request and the information about the third party content. In some implementations, the model may predict the proxy metric by receiving the set of attributes from the request and the information about the third party content, identifying weights to assign to the received attributes and information, and calculating a proxy metric. The model may have predetermined weight values based on earlier data so that the weights need not be calculated at the same time that the model predicts the proxy metric. The predicted proxy metric may provide information about at least one of subject retention or subject awareness that will result from presentation of the given third party content. In some implementations, third party content providers 114 can include a preference for either subject retention or subject awareness.

As discussed above, certain proxy metrics have a strong correlation to at least one of subject awareness or subject rejection. In order to determine a correlation between a particular proxy metric (e.g., watch time) and subject awareness or subject recall, a third party content provider may provide its content for analysis. Users may be randomly assigned to either an exposed group or a control group. The party from the third party content provider is shown to users in the exposed group but not to users of the control group. A certain amount of time after the users are assigned to a group and either exposed to or not exposed to the third party content, users from both groups are asked a number of questions (e.g., if they recently saw the third party content). The difference between positive response rates between the exposed group and the control group for a particular question asked is known as the subject lift for that question. For example, each user of an exposed group having 100 users may be shown a movie trailer for Movie A and the users in the control group having 100 users may not be shown the movie trailer. Then two days later, the users from both the exposed group and the control group are asked if they have seen the movie trailer for Movie A. If 80 users in the exposed group answered that they have seen the movie trailer for Movie A and 0 users in the control group answered that they have seen the movie trailer for Movie A, then the subject lift for that question is 80. Unfortunately, not much data is available with respect to subject lift metrics. Therefore, it is particularly beneficial to use certain proxy metrics, such as physical clicks on content, watch time associated with video content, skip time associated with video content, and viewability metrics, that have been shown to have a strong correlation with subject lift. Subject lift may further relate to subject awareness and subject retention. Generally, most proxy metrics have a strong correlation with subject awareness, and watch time and skip time have a strong correlation with subject retention.

As discussed above, third party content providers 114 may include, with their provided third party content, a preference to drive either subject awareness or subject retention, or both. In certain implementations, this preference may be taken into account when selecting content for presentation.

Continuing with the example above, the content distribution system predicts for the Minnesota Pucks hockey team video clip a proxy metric based on the set of attributes for the user (male; 22 years old; Minneapolis; smart phone), and the information about the third party content (2-minute long video clip that relates to "sports", "hockey", "Minnesota", and "Pucks"). For example, the content distribution system may identify proxy metrics shown in FIGS. 6A and 6B. The proxy metrics and attribute information shown in FIGS. 6A and 6B may be stored in the training database 112 and used by the model generator 116 to generate the model. FIGS. 6A and 6B include both proxy metrics and attribute information. For example, the second, third, and fourth columns include attribute information (M/F, age, location), and the fifth column includes a proxy metric (watch time). FIG. 6A shows watch times for eighteen users who were presented video content relating to the Minnesota Seafarers, and FIG. 6B shows watch times for eighteen users who were presented video content relating to the top ten hockey goals of all time. The columns indicate whether the user is male or female, the age of the user, a location of the user, and a watch time for the content.

FIG. 6A shows that the average watch time for the training data is 1 minute and 4 seconds for a 2 minute clip relating to the Minnesota Seafarers. However, the average watch time for users matching the user in the example—that is, only males between the ages of 18-24 in Minneapolis—is about 1 minute and 41 seconds. As may be expected, the training data shows that users outside Minnesota from Illinois, Michigan, and Wisconsin showed little interest in the video clip relating to the Minnesota Seafarers, but users from Minneapolis, and in particular, male users between 18-24 years of age had higher watch times.

FIG. 6B relates to a 2 minute video clip relating to the top ten hockey goals of all time. The training data shown in FIG. 6B shows that the average watch time for the video clip is 1 minute and 6 seconds. However, the average watch time for users matching the user in the example—only males between the ages of 18-24 in Minneapolis—is about 1 minute and 51 seconds.

The training data shown in FIGS. 6A and 6B and, in particular, the training data for males located in Minneapolis, Minn., and between the ages of 18-24, can be used to predict proxy metrics for the Minnesota Pucks video clip. For instance, the training data in FIG. 6A is associated with a video clip relating to the Minnesota Seafarers, which may be associated with key words "sports", "football", "Minnesota", and "Seafarers"; the training data in FIG. 6B is associated with a video clip relating to the top ten hockey goals of all time, which may be associated with key words "sports", "hockey", "goals", and "highlights". Thus, the training data shown in FIGS. 6A and 6B share similar subjects or topics with the third party content relating to the Minnesota Pucks—namely, "sports", "Minnesota", and "hockey". Based on this training data, then, the content distribution system may predict a proxy metric for the particular user, such as a predicted watch time of 1 minute and 46 seconds (i.e., the average of the average watch times, 1 minute and 41 seconds and 1 minute and 51 seconds, for users with shared attributes in FIGS. 6A and 6B, respectively).

At 508, the content distribution system determines that the predicted proxy metric meets, or exceeds, a threshold value for the given third party content. The threshold value may be a preset value or a percentage (e.g., a watch time being a percentage of the entire length of a video clip). In some implementations, the threshold value may be based on an average value. In the example above, the threshold value may be an average watch time for the given third party content. For example, the Minnesota Pucks video clip may have an average watch time of 1 minute and 25 seconds when provided to users for presentation. Therefore, if the predicted proxy metric for watch time is 1 minute and 46 seconds, the content distribution system determines that the predicted proxy metric of 1 minute and 46 seconds exceeds the threshold value of 1 minute and 25 seconds. In some embodiments, the third party content provider may define the threshold value or define one or more parameters for determining the threshold value.

In some implementations, the model may be trained to weigh certain attributes in the model. For example, if a particular attribute is more important than the others, the model may weigh that attribute as compared to the other attributes. In these implementations, the content distribution system predicts the proxy metric(s) based on the weighted values of the attributes.

At 510, the content distribution system identifies the given third party content for distribution based on the predicted proxy metric. Continuing the example above, in response to determining that the predicted proxy metric of 1 minute and 46 seconds exceeds the threshold value of 1 minute and 25 seconds, the content distribution system identifies the Minnesota Pucks video clip for presentation and for the content distribution server.

In some implementations, after the content distribution system identifies a given third party content for distribution based on the predicted proxy metric, the content distribution server increases a value of a selection criteria relating to the given third party content. The content distribution system may select a plurality of third party content items for distribution and assign to each of the third party content items a respective selection criteria value valued on the predicted proxy metric. For example, the higher the predicted proxy metric, the higher the respective selection criteria. Third party content items with higher selection criteria values may be more likely to be selected to be presented on a client device.

The training data shown in FIGS. 6A and 6B may further be used to illustrate how certain content may not be desirable for content presentation. For example, at 502, a request for third party content may identify that the request is from a client device used by 19 year old female user in Minneapolis, Minn. At 504, the content distribution system identifies the 2 minute video clip relating to the Minnesota Pucks and relating to key words "sports", "hockey", "Minnesota", and "Pucks".

At 506, the content distribution system predicts for the Minnesota Pucks video clip a proxy metric based on the set of attributes for the user (female; 19 years old; Minneapolis) and the information about the third party content (2-minute long video clip that relates to "sports", "hockey", "Minnesota", and "Pucks"). FIG. 6A shows that females between the ages of 18-24 in Minneapolis have an average watch time of 48 seconds for the Minnesota Seafarers video clip versus an average of 1 minute and 4 seconds. FIG. 6B shows that females between the ages of 18-24 in Minneapolis have an average watch time of 45 seconds for the top ten hockey goals versus an average of 1 minute and 6 seconds. The content distribution system may then use the model to predict a proxy metric of 47.5 seconds (the average 45 seconds and 48 seconds) for the Minnesota Pucks video clip for the 19 year old female in Minneapolis based on the similarities between the Minnesota Pucks video clip and both the Minnesota Seafarers video clip and the top ten hockey goals video clip. Based on this predicted proxy metric (watch time) of 47 seconds, the content distribution system may then determine that the predicted proxy metric does not meet or exceed a threshold value for the given third party content (e.g., the average watch time of 1 minute and 25 seconds), so the content distribution system does not select the particular third party content for display. In some implementations, after the content distribution system determines that the predicted proxy metric for the given third party content does not meet the threshold value, the content distribution server decreases a value of a selection criteria relating to the given third party content.

The content distribution system may repeat steps 504 and 506 for a plurality of third party content items until a predicted proxy metric for a particular third party content item exceeds a threshold value for the particular third party content item. Through each loop of steps 504 and 506, the content distribution server may adjust the respective selection criteria either up or down for each third party content item accordingly based on the respective predicted proxy metric.

FIG. 7 shows an example of a computing device 700 and a mobile computing device that may be used to implement the computer-implemented methods and other techniques described herein. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device

750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 770. It may also be implemented as part of a smart-phone 772, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In situations in which the systems, methods, devices, and other techniques here collect personal information (e.g., context data) about users, or may make use of personal information, the users may be provided with an opportunity to control whether programs or features collect user information (e.g., information about a user's social network, social actions or activities, profession, a user's preferences, or a user's current location), or to control whether and/or how to receive content from the content distribution system that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content distribution system.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The invention claimed is:

1. A system comprising:
   a training database that stores training data including attribute information about a plurality of users and corresponding proxy metrics that quantify online behavior by the plurality of users following video presentation;
   a content database that stores video content received from various video content providers;
   a model generator, including one or more data processors, that accesses the training data in the training database and trains a model for video distribution based on the training data; and
   a content distribution server that receives a request for video content to be presented at a client device, wherein the content distribution server uses the model to select video content to be distributed to the client device in response to the request and transmits data identifying the selected video content to the client device,
   wherein the model:
      obtains a set of attributes from the request, wherein the set of attributes relate to information about a user associated with the request,
      receives information about a given video stored in the content database,
      determines, for the given video, whether subject retention information that was obtained directly from users through a feedback mechanism is available in the content database, wherein the subject retention information indicates a likelihood that, when asked at a specified time after presentation of the given video has ended, the user will respond that they remember seeing the given video and be able to describe a subject of the given video;
      predicts, for the given video and based on the set of attributes and the information about the given video, a likelihood that, when asked at a specified time after presentation of the given video, the user will respond that they remember seeing the given video, wherein the prediction is determined by using a proxy metric of an amount of time that other content was presented before user input that interrupted presentation of the other content was received when the subject retention information obtained directly from users through the feedback mechanism is currently unavailable to the model; and
      identifies, using the predicted likelihood that the user will respond that they remember seeing the given video and for the content distribution server, the given video for distribution based on the likelihood having a value that is indicative of the user responding that they remember seeing the given video after presentation of the given video has ended.

2. The system of claim 1, wherein the information about the given video in the content database includes at least one of a category of the given video, a duration for the given video, and a feature of the given video.

3. The system of claim 1, wherein the training database further receives proxy metrics associated with displaying particular video to the client device, and wherein the model generator further retrains the model using the received proxy metrics associated with displaying the particular video to the client device.

4. The system of claim 1, wherein the model further weighs certain categories of attribute information and predicts the proxy metric based on weighted attribute information.

5. The system of claim 1, wherein the request for video content contains no known attribute information, wherein the model identifies training data regardless of attribute information.

6. The system of claim 1, wherein the attribute information about the plurality of users includes at least one of: demographic information, interest information, and historical behavior data.

7. The system of claim 1, wherein the model generator identifies and stores a correlation between a particular proxy metric and subject retention.

8. The system of claim 1, wherein the model generator identifies and stores a correlation between a particular proxy metric and subject awareness.

9. The system of claim 1, wherein the model predicts the proxy metrics using at least one of logistic regression machine learning and linear regression machine learning.

10. A computer-implemented method comprising:
    storing, in a training database, training data including attribute information about a plurality of users and corresponding proxy metrics that quantify online behavior following video presentation;
    storing, in a content database, video content received from various video content providers;
    accessing, by a model generator that includes one or more data processors, the training data in the training database and training a model for video distribution based on the training database;
    receiving, by a content distribution server, a request for video to be presented at a client device;
    selecting, by the content distribution server and using the model, video content to be distributed to the client device in response to the request, wherein the model:
       obtains a set of attributes from the request, wherein the set of attributes relate to information about a user associated with the request,
       receives information about a given video stored in the content database,
       receives information about a given video stored in the content database,
       determines, for the given video, whether subject retention information that was obtained directly from users through a feedback mechanism is available in the content database, wherein the subject retention information indicates a likelihood that, when asked at a specified time after presentation of the given video has ended, the user will respond that they remember seeing the given video and be able to describe a subject of the given video;
       predicts, for the given video and based on the set of attributes and the information about the given video, a likelihood that, when asked at a specified time after presentation of the given video, the user will respond that they remember seeing the given video, wherein the prediction is determined by using a proxy metric of an amount of time that other content was presented before user input that interrupted presentation of the other content was received when the subject retention information obtained directly from users through the feedback mechanism is currently unavailable to the model; and identifies, using the predicted likelihood that the user will respond that they remember seeing the given video and for the content distribution server, the given video for distribution based on the likelihood having a value that is indicative of the user responding that they remember seeing the given video after presentation of the given video has ended; and transmitting, by the content distribution server, data identifying the given video to the client device.

11. The computer-implemented method of claim 10, wherein the information about the given video in the content database includes at least one of a category of the given video, a duration for the given video, and a feature of the given video.

12. The computer-implemented method of claim 10, further comprising:

receiving, by the training database, proxy metrics associated with displaying particular video to the client device; and retraining the model using the received proxy metrics associated with displaying the particular video to the client device.

13. The computer-implemented method of claim 10, wherein the model further weighs certain categories of attribute information and predicts the proxy metric based on weighted attribute information.

14. The computer-implemented method of claim 10, further comprising:

identifying and storing a correlation between a particular proxy metric and subject retention.

15. The computer-implemented method of claim 10, further comprising:

identifying and storing a correlation between a particular proxy metric and subject awareness.

16. One or more non-transitory computer-readable media having instructions stored thereon that, when executed by one or more processors, cause performance of operations comprising:

storing, in a training database, training data including attribute information about a plurality of users and corresponding proxy metrics that quantify online behavior following video presentation;

storing, in a content database, video content received from various video content providers;

accessing the training data in the training database and training a model for video distribution based on the training database;

receiving a request for video to be presented at a client device;

selecting, using the model, video content to be distributed to the client device in response to the request, wherein the model:

obtains a set of attributes from the request, wherein the set of attributes relate to information about a user associated with the request, receives information about a given video stored in the content database, receives information about a given video stored in the content database, determines, for the given video, whether subject retention information that was obtained directly from users through a feedback mechanism is available in the content database, wherein the subject retention information indicates a likelihood that, when asked at a specified time after presentation of the given video has ended, the user will respond that they remember seeing the given video and be able to describe a subject of the given video;

predicts, for the given video and based on the set of attributes and the information about the given video, a likelihood that, when asked at a specified time after presentation of the given video, the user will respond that they remember seeing the given video, wherein the prediction is determined by using a proxy metric of an amount of time that other content was presented before user input that interrupted presentation of the other content was received when the subject retention information obtained directly from users through the feedback mechanism is currently unavailable to the model; and identifies, using the predicted likelihood that the user will respond that they remember seeing the given video and for a content distribution server, the given video for distribution based on the likelihood having a value that is indicative of the user responding that they remember seeing the given video after presentation of the given video has ended; and transmitting, by the content distribution server, data identifying the given video to the client device.

* * * * *